United States Patent [19]

Herlitz et al.

[11] Patent Number: 5,068,720
[45] Date of Patent: Nov. 26, 1991

[54] VIDEO INSPECTION SYSTEM FOR HAZARDOUS ENVIRONMENTS

[75] Inventors: Nils G. Herlitz; Karl I. Iglehart; John S. Sentell, all of Baton Rouge, La.

[73] Assignee: Safe T.V., Inc., Baton Rouge, La.

[21] Appl. No.: 591,839

[22] Filed: Oct. 2, 1990

Related U.S. Application Data

[63] Continuation-in-part of Ser. No. 383,182, Jul. 21, 1989, Pat. No. 4,961,111.

[51] Int. Cl.$^5$ .............................................. H04N 7/18
[52] U.S. Cl. ..................................... 358/100; 358/229; 358/335; 362/22; 359/173
[58] Field of Search ................... 358/99, 100, 108, 210, 358/335, 229; 362/22; 455/604, 612

[56] References Cited

U.S. PATENT DOCUMENTS

| | | | |
|---|---|---|---|
| 2,852,600 | 9/1958 | Jenkins | 358/100 |
| 2,916,548 | 12/1959 | Aker | 358/100 |
| 2,971,259 | 2/1961 | Hahnau et al. | 358/100 |
| 3,021,386 | 2/1962 | Clark | 358/100 |
| 3,066,969 | 12/1962 | Camac | 358/100 |
| 3,609,236 | 9/1971 | Heilman | 358/100 |
| 3,715,484 | 2/1973 | Latall | 358/100 |
| 3,958,080 | 5/1976 | Schadler | 358/100 |
| 4,346,404 | 8/1982 | Gantenbrink | 358/99 |
| 4,485,398 | 11/1984 | Chapin | 358/99 |
| 4,847,602 | 7/1987 | Altland | 358/100 |
| 4,961,111 | 10/1990 | Herlitz | 358/100 |

OTHER PUBLICATIONS

Fordom Electronics catalog, Vol. 16, No. 5, "American Fibertek Sentry Vision".

Primary Examiner—Howard W. Britton
Attorney, Agent, or Firm—Robert C. Tucker; William David Kiesel

[57] ABSTRACT

A video inspection system for hazardous environments is provided, comprising a housing, sealable so as to contain a pressurized gas therein, having a view opening therein and further including a valve for introducing pressurized gas into the housing, connected to the housing; and a transparent lens, sealingly affixed across the view opening; a camera for recording visual images through the view opening, mounted within the housing; and a power supply, for powering the camera, mounted within the housing and operatively connected to the camera. A method for operating the above system is also provided, including the steps of substantially purging undesirable gases from the interior of the housing; sealing the housing, eliminating external connections thereto; introducing non-flammable gas to the interior of the housing until the pressure in the housing reaches a desired level; and operating the camera within the housing. The system may also be operated as a portable lighting system without the camera and may utilize fiber optics communications to transmit contemporaneous signals from the camera in a hazardous environment.

4 Claims, 7 Drawing Sheets

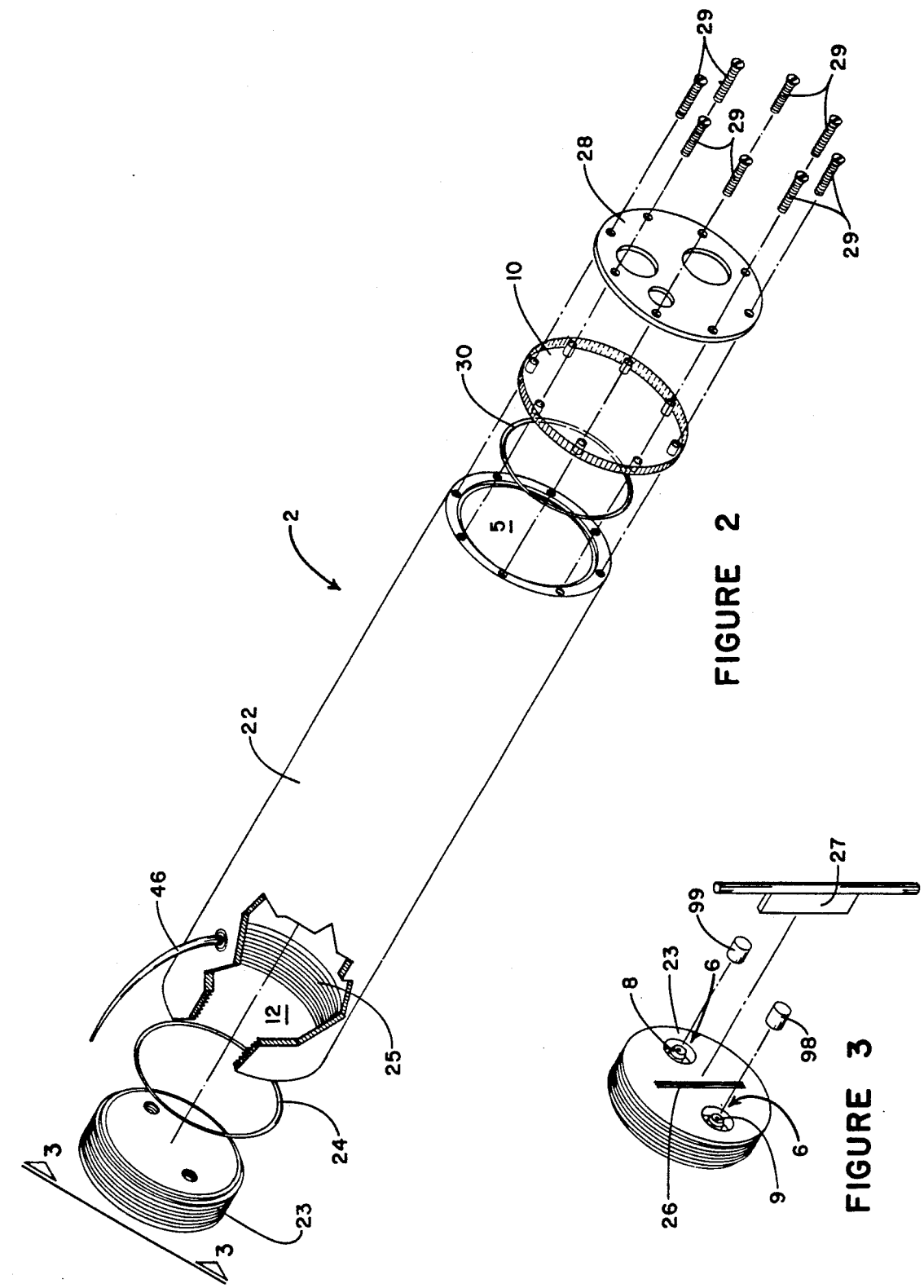

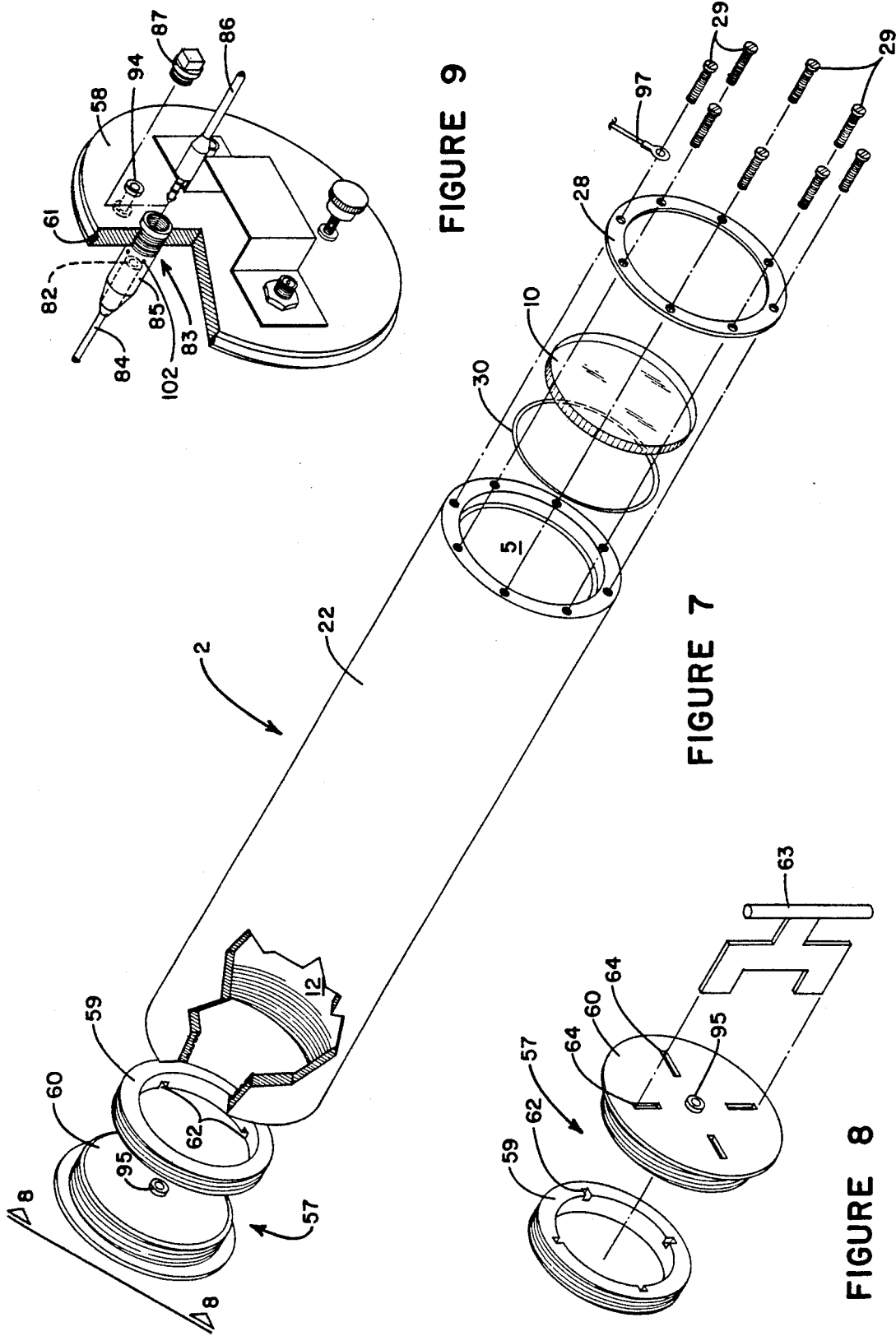

VIDEO INSPECTION SYSTEM FOR HAZARDOUS ENVIRONMENTS

This is a continuation-in-part application of U.S. patent application Ser. No. 383,182, filed on July 21, 1989, now U.S. Pat. No. 4,961,111 issued Oct. 2, 1990, by the inventors herein, entitled "Video Inspection System For Hazardous Environments", specific mention being made to obtain the benefit of the parent applications' filing date.

BACKGROUND OF THE INVENTION

1. Field of the Invention

This invention relates generally to video inspection systems which are used to view selected difficult access areas and, more particularly, to such systems which are used to access areas in potentially explosive environments.

2. Prior Art

In the field of video inspection systems, it is desirable to provide maximum protection for a video camera and associated equipment which is placed in difficult access areas. Usually a camera is placed in some sort of casing which protects the camera as it is lowered into a tank or pulled through a pipeline or other enclosure during inspection operations. When the environment within the enclosure is explosive, extreme measures must be taken to isolate the inspection system from the explosive environment.

One such system utilizes a positive pressure displacement method, wherein a camera casing is pressurized with non-flammable gas through a gas line, which is connected to the casing. Electrical energy is provided to a video camera and lighting system within the casing by electrical cables connected through the casing. Such systems are inherently dangerous since the industrial conditions often encountered by video inspections include elements which can damage or cut gas lines and electrical cables. If the gas service is interrupted, leakage could allow flammable gases or fumes into the casing, where arcing of electrical components could cause an explosion. Of course, should external electrical cables become damaged, arcing could occur outside of the casing.

SUMMARY OF THE INVENTION

Therefore, it is an object of this invention to provide a video inspection system for hazardous environments which eliminates the need for a constant external supply of non-flammable gas or electricity.

It is another object of this invention to provide a video inspection system for hazardous environments which interrupts power to the camera and/or lighting unless a desirable pressure is maintained within the system.

It is still another object of this invention to provide a video inspection system for hazardous environments which provides an internal back-up supply of non-flammable gas which can be released in the event of a leak in the system.

It is a further object of this invention to provide a video inspection system for hazardous environments which quickly cools system lighting in the event of an unanticipated pressure drop within the system.

It is yet a further object of this invention to accomplish desired combinations of the above objects.

Accordingly, a video inspection system for hazardous environments is provided, comprising a housing, sealable so as to contain a pressurized gas therein, having a view opening therein and further including a valve for introducing pressurized gas into the housing, connected to the housing, and a transparent lens, sealingly affixed across the view opening; a camera for recording visual images through the view opening, mounted within the housing; and a power supply, for powering the camera, mounted within the housing and operatively connected to the camera. The system can be supplied with a pressure switch which interrupts power to the camera if pressure within the housing is not within desired limits. Further, the system can be supplied with a purge gas tank and solenoid valve, which releases pressurized non-flammable gas into the housing should housing pressure drop below a desired level.

BRIEF DESCRIPTION OF THE DRAWINGS

FIG. 2 is an exploded perspective view of an embodiment of the housing of the invention.

FIG. 3 is a perspective view of an embodiment of the back plate of the invention.

FIG. 7 is an exploded perspective view of an alternate embodiment of the housing of the invention.

FIG. 8 is a perspective view of an alternate embodiment of the back plate assembly of the invention.

FIG. 9 is a cutaway view of the remote control purge assembly of the invention.

DETAILED DESCRIPTION OF PREFERRED EMBODIMENTS OF THE INVENTION

Figure 1:
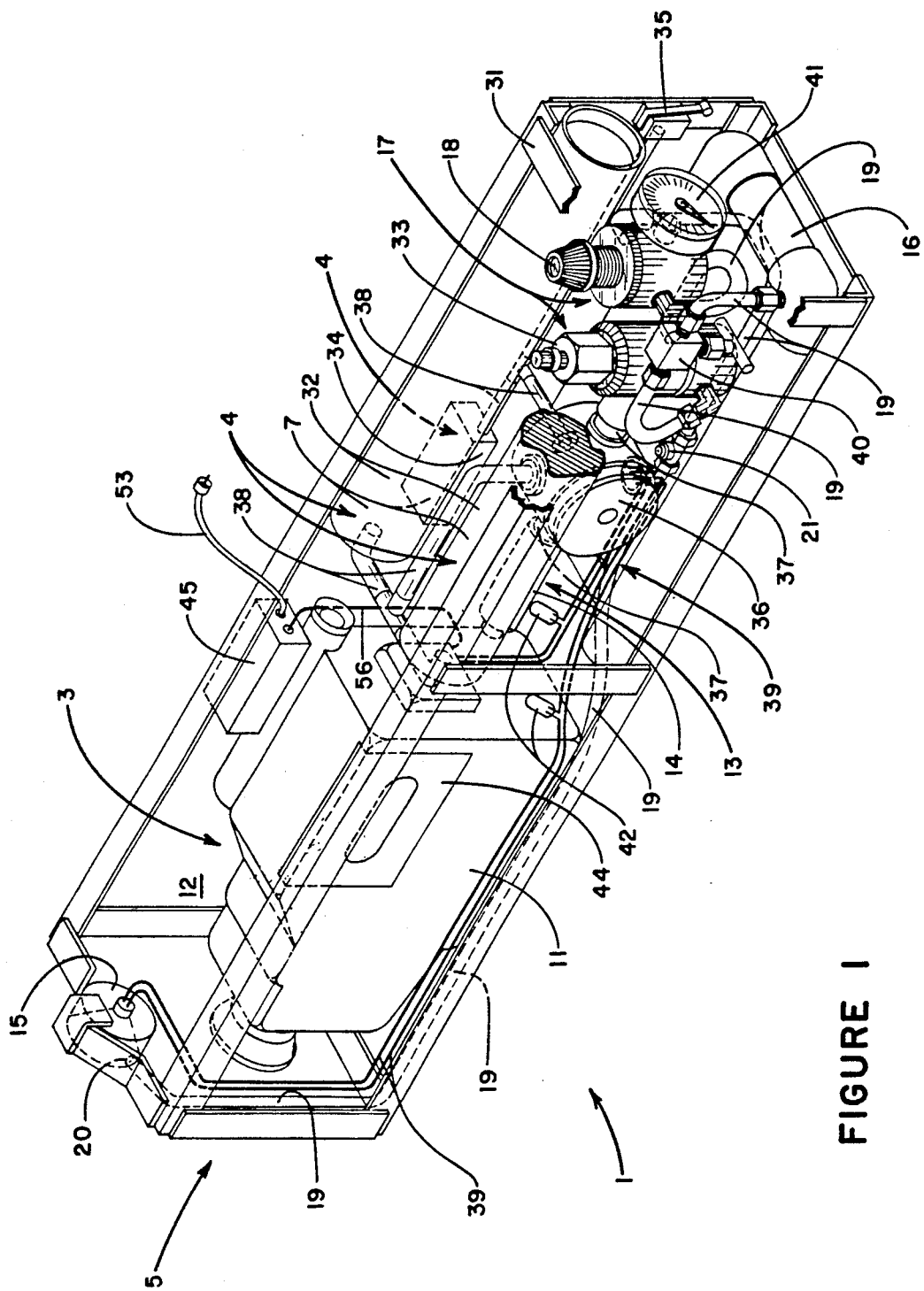
FIG. 1 is a cutaway perspective view of an embodiment of the internal components of the invention, with the housing removed for clarity.

As shown in FIG. 1, the video inspection system 1 generally comprises a housing 2 (shown in FIG. 2), which contains a camera means 3, such as video camera 11 (such as a Sony CCD-F40 video camera recorder), for recording visual images, and a power supply 4, such as batteries 7, for powering camera means 3. Housing 2 is sealable so as to contain a non-flammable pressurized gas, such as nitrogen, therein and is provided with a view opening 5 and lens 10 through which camera means 3 may view the outside environment. A means 6, for introducing pressurized gas into housing 2 is provided. Means 6 may include a fill valve 8 and purge valve 9 as shown. A lighting means, such as light 15, may also be provided for necessary illumination through view opening 5. Thus the basic system 1 allows camera 11 to be operated in a safe, pressurized environment without dangerous external connections. If a small leak or major breakage occurs in housing 2, the positive differential pressure within housing 2 causes the gas from interior 12 to flow out of housing 2, temporarily maintaining the non-explosive integrity of interior 12.

However, it is desirable that the system 1 provide for greater safety during operation in hazardous environments so as to guard against explosion. Thus, a means 13, for preventing operation of camera 11 when the pressure within housing 2 is below a desired level, is provided. Means 13 preferably includes an explosion-proof pressure switch 14 (such as Sigma-Netics, Inc. No. 703-UAA switch), which prevents operation of camera 11 and light 15 when pressure within housing 2 is below a desired level. Pressure switch 14 can be set to provide power to camera 11 and light 15 when internal pressure reaches a desired threshold pressure, and to cut power when internal pressure falls below a desired level. For example, it has been found that an internal pressure of twelve pounds per square inch is desirable to establish camera 11 and light 15 power, while an internal pressure of eight pounds per square inch causes power to be cut prior to complete depressurization of housing 2. Also, the lower pressure level necessary for disconnection of power allows for minor leakage to take place without disabling the system 1. Thus, should housing 2 be cracked or have its integrity otherwise compromised, power systems which could possibly arc and cause an explosion in hazardous environments are disabled before any hazardous environment can enter housing 2.

In order to insure additional system safety, further redundancy may be provided. A purge gas tank 16 is provided inside housing 2, and is filled with a pressurized non-flammable purge gas, (which may be in liquid state within purge gas tank 16) such as Freon ®. A means 17, for releasing gas from purge tank 16 when pressure within housing 2 falls below a desired level, is mounted within housing 2 and connected to purge gas tank 16. Means 17 preferably comprises a solenoid valve 33 and pressure regulator 18. Solenoid valve 33 is set to release gas from purge gas tank 16 when pressure within housing 2 falls below a desired threshold. For example, solenoid valve 33 (such as a Skinner Valve No. X54LB2150 mini-solenoid valve) can be set to release gas from tank 16 when pressure within housing 2 falls below eight pounds per square inch, slowing the rate of decrease in pressure within housing 2 and providing additional time for system shutdown should a major leak in housing 2 occur. Regulator 18 (such as a Norgren RO6-221-RHKA mini-regulator) controls the release of purge gas at a desired rate of flow. Further safety is provided by purge distribution line 19 which distributes purge gas throughout interior 12. Light jet 20 provides a discharge point in distribution line 19 and is directed upon light 15 such that purge gas cools light 15 as the gas flows into housing 2. Additional purge gas distribution is provided by mid-jet 21.

As can be seen in FIGS. 1-3, housing 2 preferably includes a tubular case 22. Back plate 23, having an O-ring 24, is threaded so as to engage with threads 25 in case 22. Fill valve 8 and purge valve 9 are mounted on back plate 23. Fill valve 8 is preferably a Schrader valve and is sealed after filling by safety cap 98. Purge valve 9 may simply be an open port since it is used only to vent air from the system, and is sealed after purging by safety cap 99. Slot 26 allows back plate 23 to be tightened and loosened by T-wrench 27. Lens 10 is constructed of a material such as polycarbonate and is secured over view opening by face plate 28 and screws 29. O-ring 30 provides a seal for lens 10. Preferably, case 22 and back plate 23 are constructed of a spark-proof material, such as polyvinyl chloride.

Figure 4:
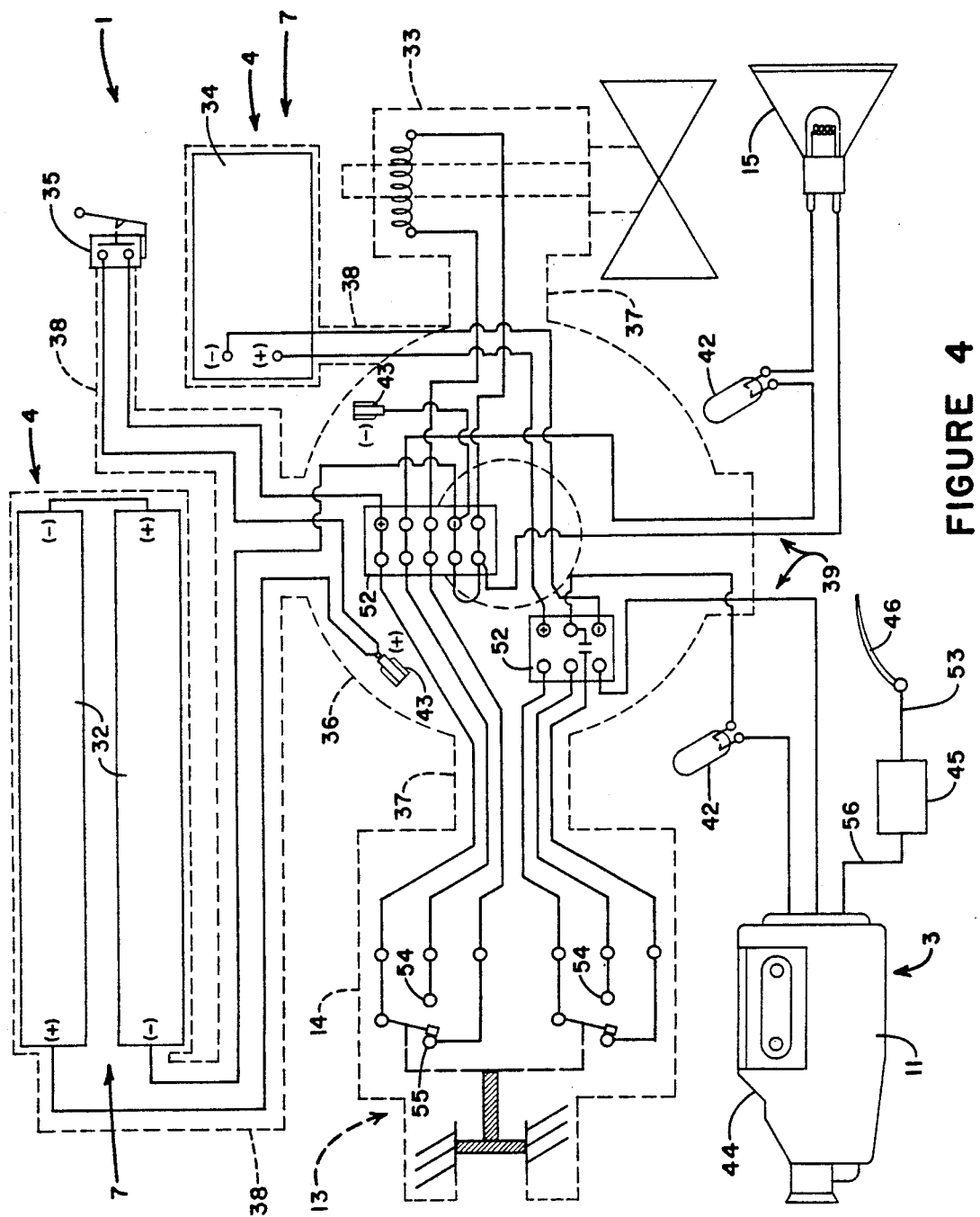
FIG. 4 is an electrical schematic diagram of an embodiment of the invention.

As shown in FIG. 1, mounting frame 31 provides a means for attachment of various internal components of the system 1. Thus, the internal components are easily removable and serviceable. A sealed explosion-proof twelve-volt battery pack 32 provides power to solenoid valve 33 and light 15. A sealed explosion-proof six-volt battery pack 34 powers camera 11. A spring-loaded, explosion-proof power switch 35 (such as Haydon Switch and Instrument, Inc. Series 6100 Environmentally sealed basic switch) closes when back plate 23 is installed, providing power from twelve-volt battery pack 32. Pressure switch 14 and solenoid valve 33 and their associated wiring are connected to an explosion-proof junction box 36 via explosion-proof sealed conduits 37. Wires running from power switch 35 to junction box 36, from battery pack 32 to junction box 36, and from battery pack 34 to junction box 36 are contained by sealed conduits 38. Junction box 36 is preferably explosion-proof, such as those manufactured by Appleton Electric Company. Thus, all wiring which is unprotected by pressure switch 14 is isolated from the environment of interior 12. As shown, it is not necessary to enclose to encase wiring 39 exiting junction box 36 and running to camera 11 and light 15. However, it is important that the point where such wiring 39 exits junction box 36 be sealed to maintain the explosion-proof integrity or the interior of junction box 36. FIG. 4 shows the electrical layout of the system 1, including terminal boards 52.

Purge distribution line 19 runs from purge tank 16 through cutoff valve 40, through solenoid valve 33, through pressure regulator 18 and out to mid-jet 21 and light jet 20. A pressure gauge 41 is connected to regulator 18 to enable the user to read purge gas pressure and verify operation of solenoid valve 33.

System operation is simple, safe and effective. Twelve-volt battery pack 32 is charged via charger connections 43 (see FIG. 4) and a charged six-volt battery pack 34 is attached to the system 1 (six-volt battery pack 34 may be charged through Camera 11). Purge gas (such as Freon ®) is added to purge gas tank 16 through cutoff valve 40, cutoff valve 40 is attached to purge distribution line 19, and cutoff valve 40 is opened. Mounting frame 31 containing internal components is then placed inside case 22 and oriented such that Camera 11 will record images through view opening 5. Back plate 23 is screwed into threads 25 to a point where a substantial seal is established, but not so far as to activate power switch 35. Undesirable gases (flammable gases and/or air) are purged from the system by injecting non-flammable gas (such as nitrogen) through fill valve 8 and purging through purge valve 9 until interior 12 is substantially filled with nonflammable gas at a desired pressure, such as greater than twelve pounds per square inch.

When camera operation is desired, back plate 23 is simply further tightened to engage power switch 35. If interior pressure is above a pre-set value, such as twelve pounds per square inch, then pressure switch 14 closes, supplying power to and activating camera 11 and light 15. When pressure switch 14 is open, solenoid valve 33 is activated and supplies gas from purge gas tank 16 to regulator 18. Thus, when gas pressure within interior 12 is at a desired level, camera 11 and light 15 operate. Camera 11 preferably includes a recorder 44 for recording images on video tape. However, a means for transmitting a signal to a point remote from housing 2, such as transmitter/receiver 45 known in the art (with antenna 46 connected via cable 53) may be utilized to transmit video images from the system 1 to a remote location as well as to receive remote control data to operate camera 11 and/or light 15. If desired, mercury switches 42 may be utilized to operate camera 11 and light 15 only when the system 1 is oriented at a desired angular position.

As stated previously, when a leak occurs, pressure switch 14 will open contacts 54 (See FIG. 4) to camera 11 and/or light 15 when pressure equals a threshold level, such as eight pounds per square inch. Solenoid valve 33 is energized at secondary contact 55 opening solenoid valve 33 (regulated by regulator 18) when interior pressure falls below a threshold level, such as eight pounds per square inch. Purge gas then flows through mid-jet 21 and light jet 20, slowing depressurization and cooling light 15. Camera 11 and light 15 will not operate again until internal pressure rises to the initial threshold pressure (twelve pounds per square inch in the example used herein).

Figure 6:
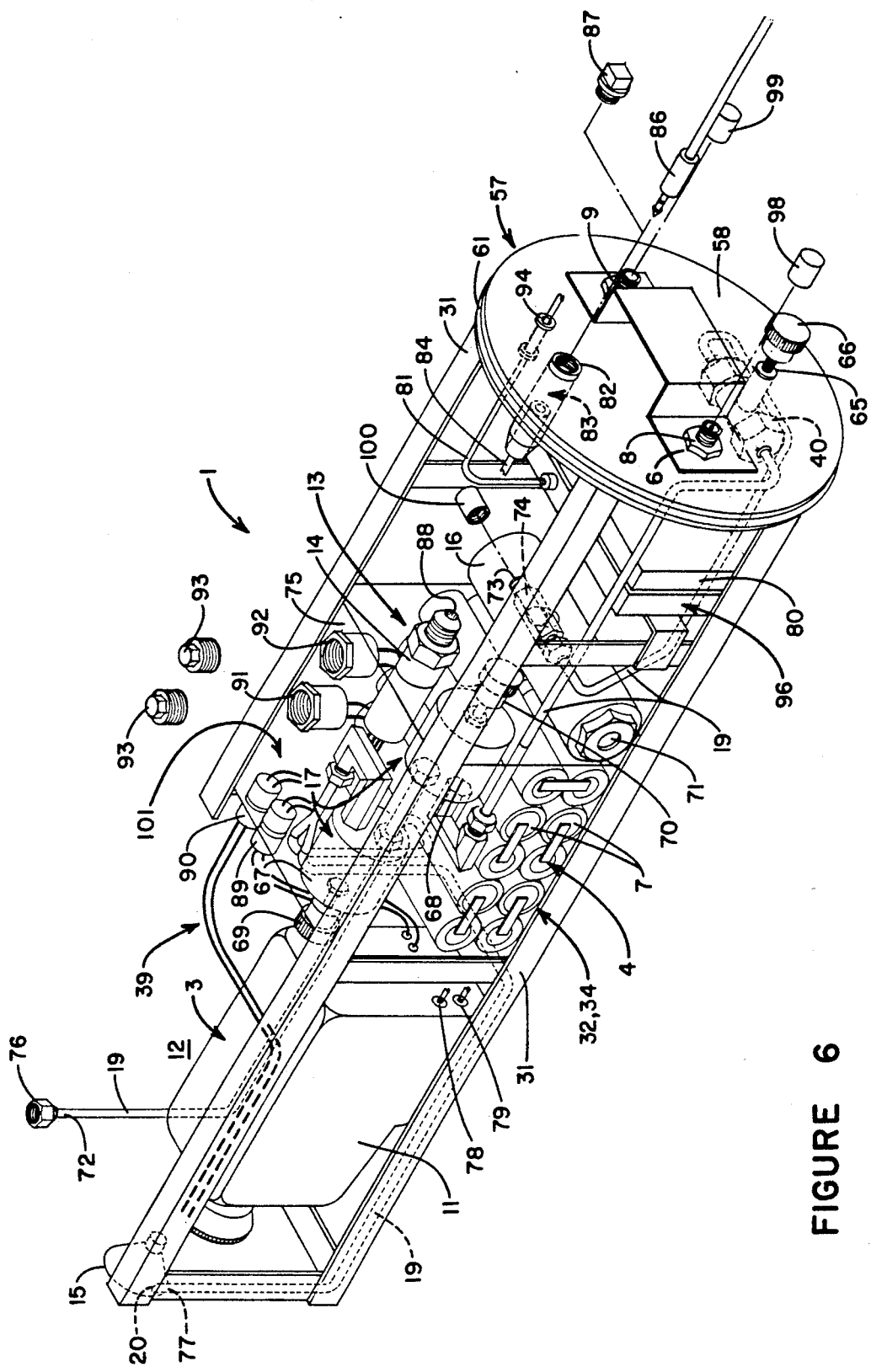
FIG. 6 is a cutaway perspective view of an alternate embodiment of the internal components of the invention, with the housing removed for clarity.

An alternate embodiment of the invention is shown in FIGS. 6-10. In this embodiment, several changes have been made which facilitate a more efficient use of the invention 1. As shown in FIGS. 6-8, back plate assembly 57 includes a back plate 58, a sealing ring 59, and a dust cover 60. Back plate 58 is fixedly attached to mounting frame 31 and is provided with an o-ring 61 to provide a seal within case 22. With back plate 58 attached to frame 31, greater access to interior components can be obtained, eliminating some parts and allowing the system 1 to be constructed smaller and lighter. Installation of the frame 31 within case 22 is accomplished by inserting the frame 31 into the case 22. A seal is obtained by installing threaded sealing ring 59 and tightening it into place utilizing slots 62 and tool 63. Once the system is purged and operating, dust cover 60 is installed and tightened utilizing slots 64 and tool 63.

In order to allow power for camera 11 to be activated from outside the housing 2, a remote control jack 82 is positioned in back plate 58. In order to prevent a small amount of air from being trapped within jack 82, a remote control purge assembly 83 is provided. As shown in FIG. 9, interior remote control line 84 terminates at jack 82, which is positioned within a pipe nipple 85, positioned in back plate 58. Nipple 85 has small perforations 102 which allow a very small amount of gas from within housing 2 to flow through nipple 85, purging air from around jack 82. Once camera operation is initiated, male end 86 of jack 82 is removed and a threaded plug 87 is installed in nipple 85 to stop the purge flow and seal the system.

The stationary nature of back plate 58 permits cutoff valve 40 to be fixedly and sealingly mounted on back plate 58, with the valve stem 65 and handle 66 extending through back plate 58 to facilitate exterior operation of valve 40. Thus, the operator can control activation of purge distribution line 19 from the exterior of the case 22, eliminating the need for solenoid valve 33, power switch 35, terminal boards 52 and secondary contacts 55. Purge distribution line 19 runs from cutoff valve 40 directly to pressure regulators 67 and 68, having control knobs 69 and 70, respectively. Regulators 67,68 are standard 0-30 lb. instrumentation grade regulators, placed in series for redundancy (only one is necessary), and set to release purge gas at a desired rate when pressure within housing 2 falls below a desired level. Regulators 67,68 sense the pressure within the housing 2 through the terminating point(s) 77 of purge distribution line 19. A sight glass 71 is provided in purge gas tank 16 for verification of the presence of purge gas, eliminating the need for pressure gauge 41. Purge gas can be added through fill valve 73 (preferably a Schrader valve), located in tee 74. Saftey cap 100 is provided to protect and seal fill valve 73.

As can be seen in FIG. 6, all batteries 7, regulators 67,68, pressure switch 14 and associated wiring 101 are centrally located and hermetically sealed within a solid block of nonconductive epoxy 75 in order to explosion-proof the system, with the pressure sensing end 88 of pressure switch 14 extending through block 75. This arrangement eliminates the need for junction box 36 and sealed conduits 37 and 38. Also, with regulators 67,68 also sealed within the block 75, the regulators 67,68 have a reference pressure (1 atmosphere) within the block 75 to which the pressure exterior of block 75 and within the housing 2 can be compared. Control knobs 69,70 extend outside of block 75, allowing the user to calibrate the regulators 67,67, using a pressure gauge which can be attached to gauge connection 76 at the terminating point 77 of purge distribution line 19.

Figure 10:
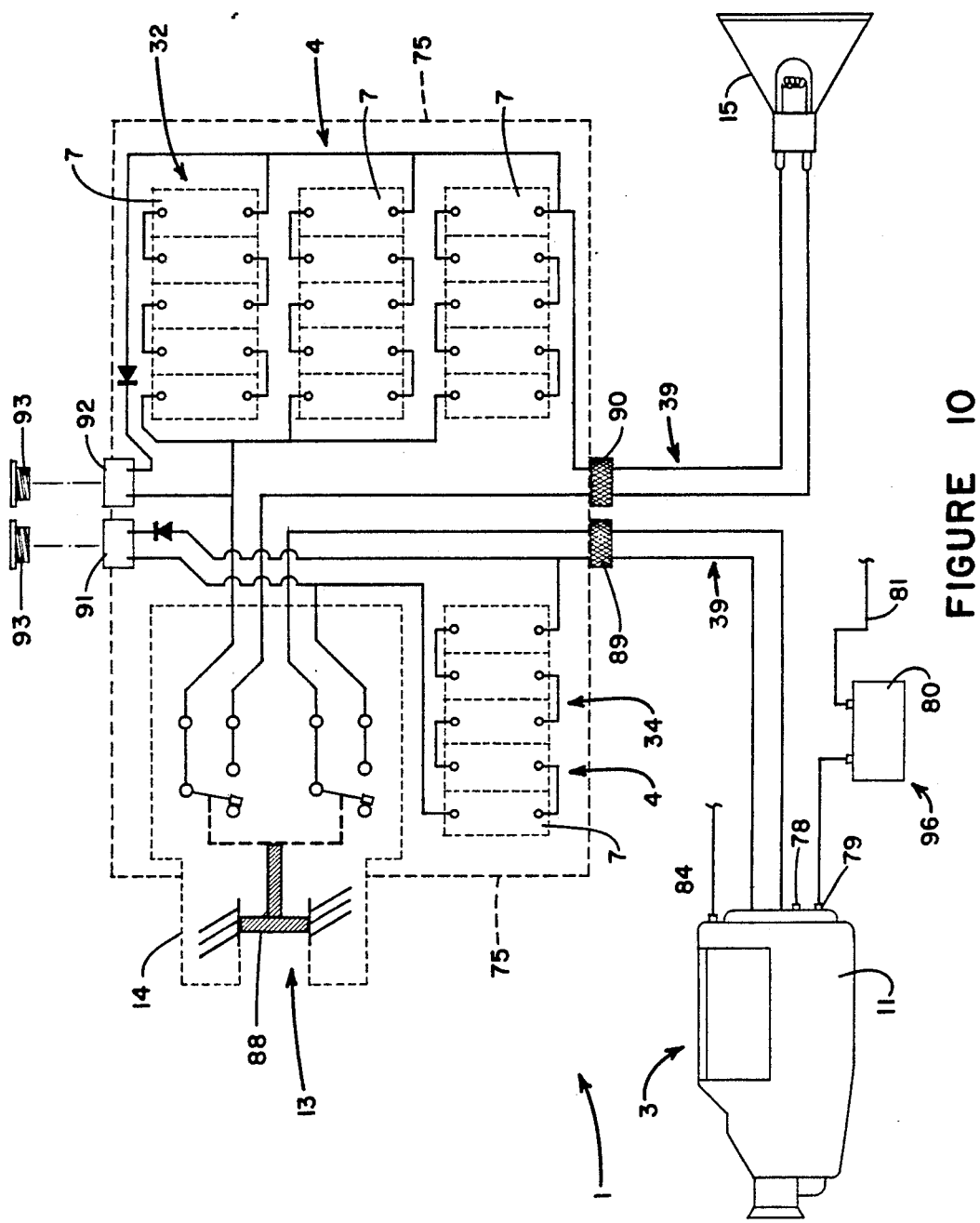
FIG. 10 is an electrical schematic diagram of an alternate embodiment of the invention.

FIG. 10 depicts a revised electrical schematic for the embodiment shown in FIGS. 6-9. As stated above, pressure switch 13 simply activates or deactivates camera 11 and light 15, and solenoid valve 33 and associated circuitry have been eliminated. Camera 11 and light 15 are connected to the electrical system via connector jacks 89 and 90, respectively, which are cast in the exterior of block 75. Camera battery charger port 91 and light battery charger port 92 are also cast in the exterior of block 75, and provide charger access to battery packs 32 and 34. Threaded plugs 93 (see FIG. 6) seal ports 91,92 when not in use.

Operation of the system shown in FIGS. 6-10 is similar to that of the embodiment shown in the other Figures. The camera 11 is installed in frame 31. The camera lens is checked for dust, as is housing lens 10. The Freon level is checked via sight glass 71. Camera settings are set and checked, including zoom and focus. Charger plugs 93 are installed. Frame 31 is installed in case 22 and sealing ring 59 is installed. Case 22 is purged as previously described (preferably with enough nitrogen to displace at least four times the interior volume of case 22) and filled with nitrogen to a desired pressure level. Male end 86 of remote control jack 82 is inserted, camera 11 is activated via remote control, male end 86 is disconnected and plug 87 is installed and tested for leakage. Cutoff valve 40 is opened via handle 66. Dust cover 60 is installed and static ground line 97 is connected, if desired. The system 1 is then operating and ready for use within a hazardous environment.

In order to allow for further miniaturization of the system, visual video output 78 and infrared output 79 (if available on camera 11) are connected to a means 96 for converting a video signal to a light signal and transmitting the light signal, such as fiber optic transmitter/receiver 80 (such as those manufactured by Hewlett-Packard) and fiber optic cable 81. Transmitter/receiver 80 converts and transmits the signal through fiber optic cable 81 to a desired location for monitoring or recording, eliminating the need for a recorder 44 located within housing 2 and allowing explosion-proof transmission of signals for contemporaneous viewing. Fiber optic cable 81 exits housing 2 via sealed cord grip grommets 94 and 95 in back plate 58 and dust cover 60, respectively.

Figure 5:
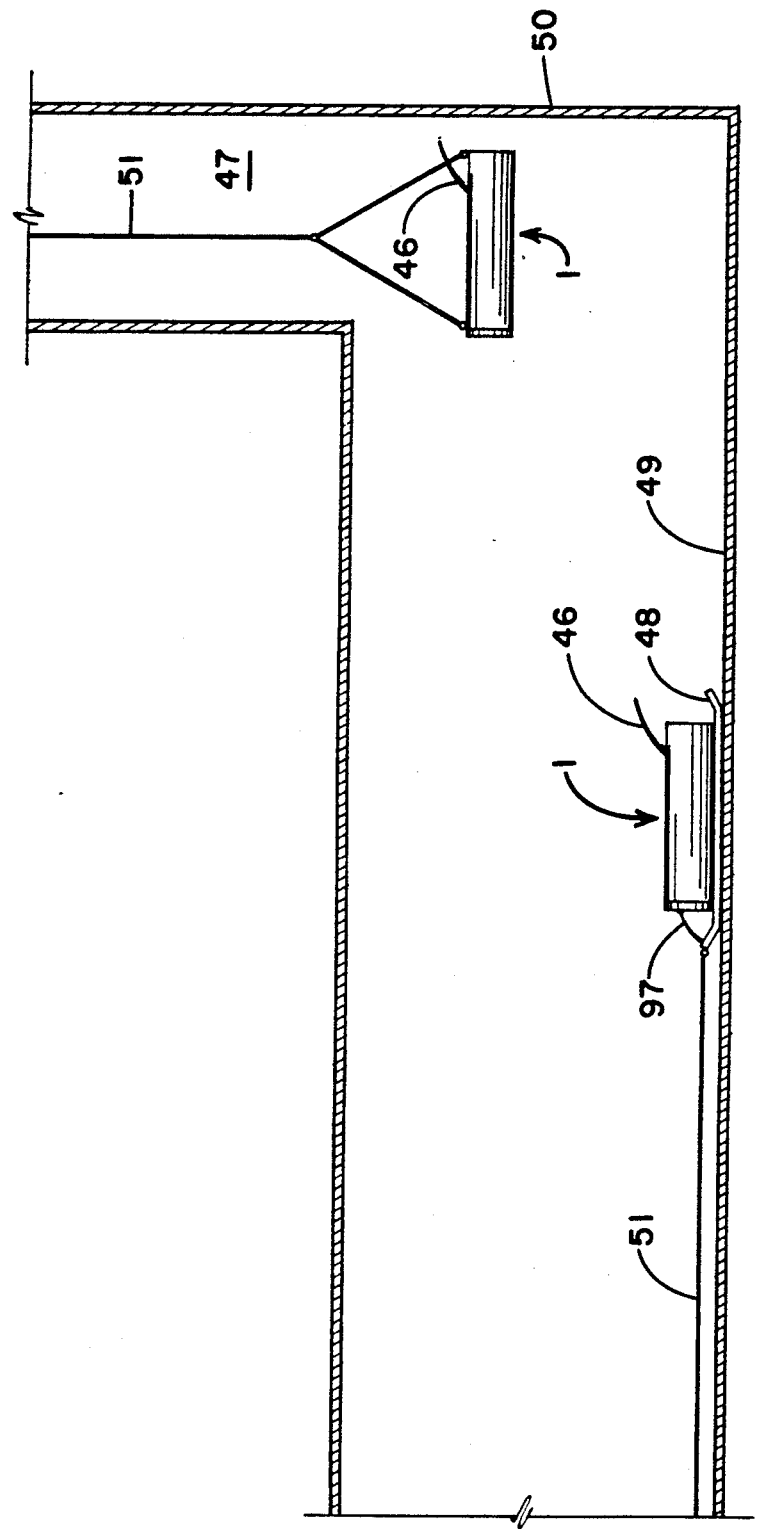
FIG. 5 is a sectional view of an enclosure illustrating the use of the invention.

Thus, a video inspection system 1 is provided which enables the user to safely inspect explosive or other hazardous environments. As shown in FIG. 5, the system 1 may be lowered through a shaft 47 or other enclosure for inspection, or be placed on skids 48 and pulled along the bottom 49 of an enclosure 50. If static electricity is an anticipated problem, static ground line 97 can be attached to housing 2 and to a remote ground connection. Support lines 51 may be used to lower or pull the system during operation, as shown. Support lines 51 may also be used to send or receive signals to or from transmitter/receiver 45 through its antenna 46. Support lines 51 may also support fiber optic cable 81, if used to transmit images as described above. Also, camera 11 may be eliminated and light 15 enlarged so as to provide an explosion proof portable lighting system. Of course, other embodiments of the invention 1 will occur to those skilled in the art, and are intended to be included within the scope and spirit of the following claims.

I claim:

1. A video inspection system for hazardous environments, comprising:
   a. a housing, sealable so as to contain a pressurized gas therein, having a view opening therein and further including:
      i. a means for introducing pressurized gas into said housing, connected to said housing; and
      ii. a transparent lens, sealingly affixed across said view opening;
   b. a camera means for recording visual images through said view opening, mounted within said housing and having a video output;
   c. a power supply, for powering said camera means, mounted within said housing and operatively connected to said camera means; and
   d. a means for converting a video signal to a light signal and transmitting said light signal, operatively connected to said video output of said camera means.

2. A video inspection system for hazardous environments according to claim 1, wherein said means for converting a video signal to a light signal and transmitting said light signal includes a fiber optics transmitter, connected to said video output of said camera means, and fiber optics cable, connected on one end to said transmitter and on the other end to a fiber optics receiver remote from said housing, and wherein said housing is sealed at the point where said fiber optics cable exits said housing.

3. A video inspection system for hazardous environments, comprising:
   a. a housing, sealable so as to contain a pressurized gas therein, having a view opening therein and further including:
      i. a means for introducing pressurized gas into said housing, connected to said housing; and
      ii. a transparent lens, sealingly affixed across said view opening;
   b. a camera means for recording visual images through said view opening, mounted within said housing and having a video output;
   c. a power supply, for powering said camera means, mounted within said housing and operatively connected to said camera means;
   d. a means for preventing operation of said camera means when the pressure within said housing is below a desired level, mounted within said housing and operatively connected between said camera means and said power source; and
wherein said power source and the connections between said means for preventing operation of said camera means and said power source are sealed within a solid block of non-conductive material.

4. A video inspection system for hazardous environments according to claim 3, further comprising:
   e. a purge gas tank mounted within said housing;
   f. a means for releasing gas from said purge gas tank when the pressure within said housing falls below a desired level, mounted within said housing and connected to said purge gas tank; and
   g. a cutoff valve connected between said purge gas tank and said means for releasing gas from said purge gas tank, said cutoff valve having a valve stem extending sealingly through said housing.

* * * * *